United States Patent Office 3,073,260
Patented Jan. 15, 1963

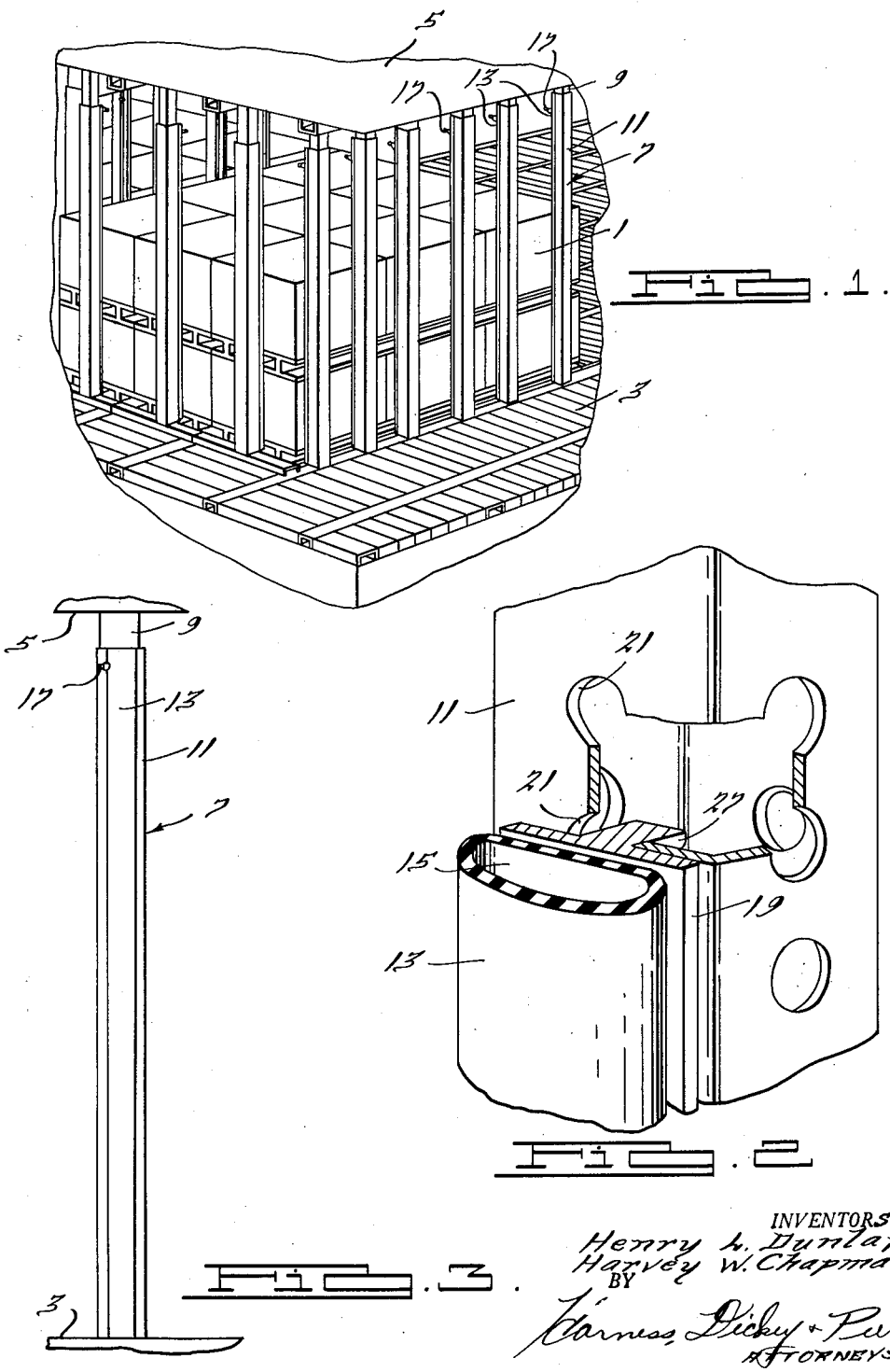

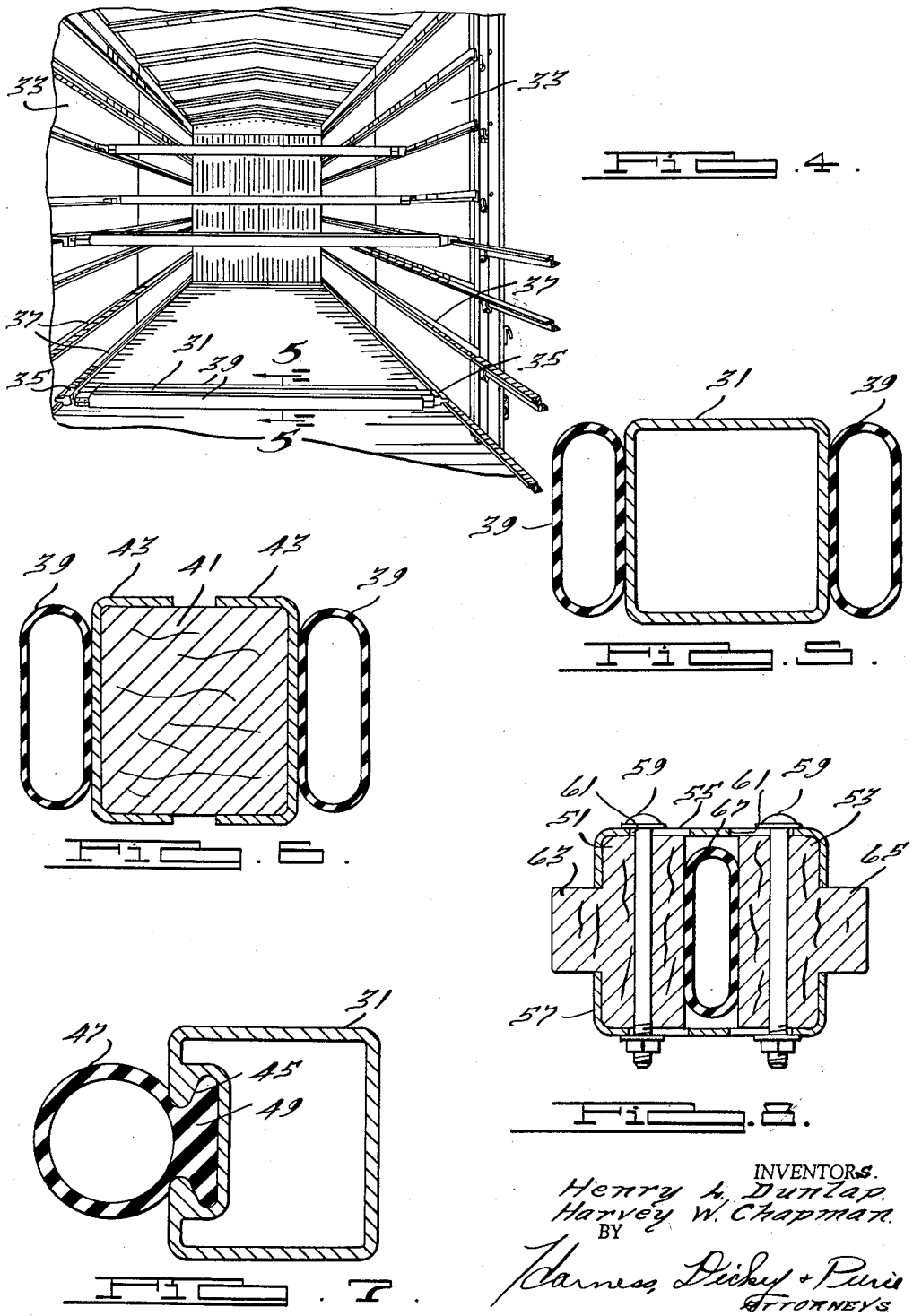

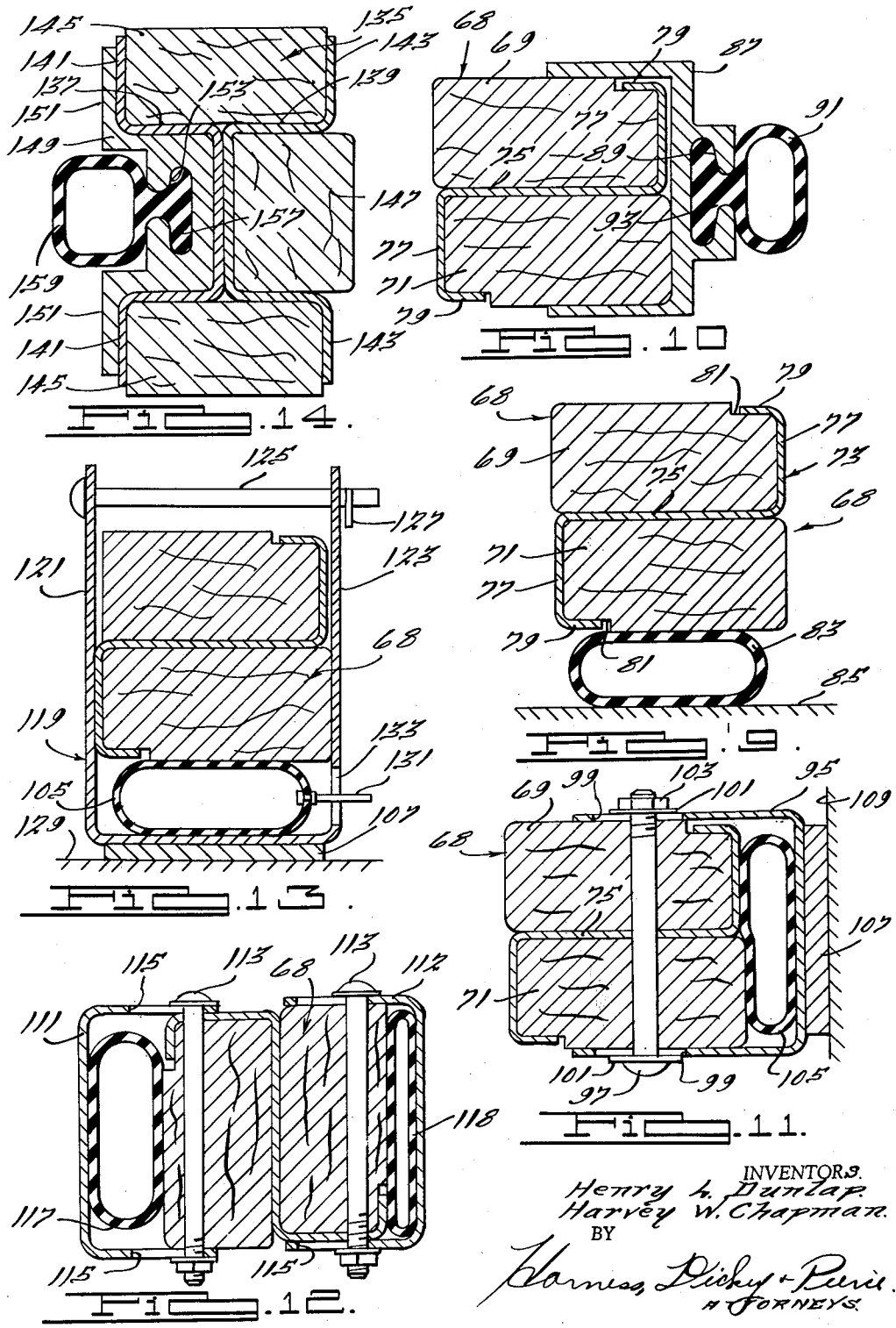

3,073,260
FREIGHT SUPPORTING MEMBERS
Henry L. Dunlap, Dearborn, and Harvey W. Chapman, Detroit, Mich., assignors to Evans Products Company, Plymouth, Mich., a corporation of Delaware
Filed May 7, 1958, Ser. No. 733,752
2 Claims. (Cl. 105—369)

This invention relates to the bracing of freight, and in particular refers to an improved freight bracing bar for preventing the shifting of lading while it is being transported.

It is an object of this invention to provide yieldable means for engaging freight to brace it in shipping position.

Another object of this invention is to provide means for engaging freight with an adjustable and controllable force.

Another object of the invention is to provide a freight bracing bar having means for taking up slack between the stowed articles and the bracing bar.

Another object of the invention is to provide a freight bracing bar having an inflatable element thereon which can be expanded laterally outwardly of the bar to span existing cavities between the bar and freight and thus provide a fine adjustment for engaging the freight without recourse to shimming.

Another object of this invention is to provide a freight bracing bar which will absorb energy and dampen movements resulting from a tendency of braced articles to shift position.

Another object of the invention is to provide a freight bracing bar having means thereon which can be readily checked in order to determine whether or not the articles are braced with the proper force.

The invention accomplishes these and other objects by means of a construction in which an inflatable tube is attached to a freight bracing bar extending between opposite supporting surfaces of the storage chamber in which the articles are stowed.

The invention will be illustrated in the accompanying drawings showing a preferred embodiment thereof and in which:

FIGURE 1 is a broken perspective view showing freight bracing bars embodying the invention in position to brace stowed articles of freight or the like;

FIG. 2 is an enlarged perspective view of a portion of one of the cross bars with the invention embodied therein;

FIG. 3 is a side elevation of one of the cross bars embodying the invention;

FIG. 4 is a broken perspective view of the inside of a boxcar showing freight bracing bars embodying features of the invention in position to brace stowed articles of freight or the like;

FIG. 5 is a cross sectional view of one of the freight bracing bars illustrated in FIG. 4, taken along the line 5—5 thereof;

FIG. 6 is a cross sectional view of a freight bracing bar similar to that of FIG. 5 illustrating a modification of the invention;

FIG. 7 is a cross sectional view of a freight bracing bar similar to that of FIG. 5 illustrating another modification of the invention;

FIG. 8 is a cross sectional view of a freight bracing bar similar to that of FIG. 5 illustrating a further modification of the invention;

FIG. 9 is a cross sectional view of a freight bracing bar similar to that of FIG. 5 illustrating a further modification of the invention;

FIG. 10 is a cross sectional view of a freight bracing bar similar to that of FIG. 5 illustrating a further modification of the invention;

FIG. 11 is a cross sectional view of a freight bracing bar similar to that of FIG. 5 illustrating a further modification of the invention;

FIG. 12 is a cross sectional view of a freight bracing bar similar to that of FIG. 5 illustrating a further modification of the invention;

FIG. 13 is a cross sectional view of a freight bracing bar similar to that of FIG. 5 illustrating a further modification of the invention; and FIG. 14 is a cross sectional view of a freight bracing bar similar to that of FIG. 5 illustrating a further modification of the invention.

FIGURE 1 shows a freight storage space such as might be found in the hold of a ship and which contains the stacked articles or boxes 1 which are to be braced in position so that they will not shift parallel to the floor 3 or the ceiling 5 of the freight storage chamber. Side supporting surfaces for engaging the articles 1 and preventing such shifting thereof are provided by a series of vertical freight bracing bars 7. These may be of various constructions but are preferably made in accordance with the teachings of a copending application, Serial No. 457,474, filed on September 21, 1954, now Patent No. 2,834,304, assigned to the assignee of the present invention.

The bars 7 consist of an inner member 9 and an outer member 11 which telescopically receives the inner member so that the effective length of the bar 7 may be adjusted to suit the distance between the ceiling and the floor or between side walls in the event that the bar is sused in the horizontal position. The ends of the inner and outer members are provided with suitable locking means (not shown) for securing them fixedly in position to the supporting surfaces, that is, to the floor and to the ceiling.

When the members 7 are arranged around the stacked articles 1 as seen in FIG. 1, it will be recognized that there is likely to be some slack or space between the articles which would permit a certain amount of shifting. This is due to the fact that the bar 7 must be placed in alignment with the holding means on the floor and ceiling and the latter are ordinarily arranged in patterns which do not cover the complete area of the ceiling or floor. In order to take up the slack, an inflatable tube 13 constructed of rubber or other suitable fluid impervious material is provided.

As most clearly illustrated in FIGS. 2 and 3, the tube 13 is closed at opposite ends and has a hollow center chamber 15 which can be filled with air or other suitable pressure fluid through a valve 17 which, if air is used, may be a conventional tire valve. The tube 13 is cemented or otherwise suitably affixed to a backing plate 19 which is preferably rigid and extends along the entire length of the tube. The bars 7 are provided with a series of vertically spaced holes 21, as taught in the aforementioned copending application to facilitate the connection of the backing plate 19 to the outer member 11.

For this purpose, the backing member 19 may be provided with a series of pins or studs 27 which have the same pitch as certain of the holes 21 so that the backing plate may be placed against the surface of the outer member 11 to enable the pins to enter the holes. In order to prevent removal of the backing plate 19 and pins 27 from the holes 21, the pins may be provided with a groove for seating a rubber ring of slightly larger diameter than the holes so that after the pins have been forced through them, the rubber will expand to yieldably hold the backing plate and the attached tube firmly in position. However, in the preferred embodiment, the pressure of the freight against the inflatable tube may be relied on to maintain the backing plate in engagement with the bar 7.

It will be seen from FIG. 1 that it is a simple matter for an attendant to inflate the tubes on the various bars 7 by means of the valves 17. He can also check the snugness of the stowed articles by simply attaching a suitable gauge to the various valves to check the air pressure within the tubes 13. When air is injected into the tubes, they will expand and force the articles tightly against each other and against opposite bars or supporting surfaces. This will provide a firm load bracing and also act to cushion the load against shocks.

It is apparent that the inflatable tubes have a cushioning or shock absorbing effect. The combination of this cushioning and shock absorbing action, with the take-up action produced upon inflation of the tubes greatly facilitates the proper supporting and bracing of delicate loads. As an illustration of a suitable pressure range usable in connection with many types of loads, the tubes may be inflated to pressures within the range of 14 to 30 pounds. Also, pressure below or above this range may be used, depending upon the size and shape of the tubes, the material of the tube and the nature of the load being braced. The inflatable tubes may be manufactured in any suitable way. The manufacture of these tubes by extrusion readily lends itself to the various cross sections which may be desired for particular adaptations, several of which are illustrated in the drawings. If desired, the tubes may be provided with a facing of canvas or other suitable material.

As previously stated, the freight bracing bars may also be employed in a horizontal position and FIG. 4 shows a freight storage space within a boxcar wherein freight bracing bars 31 extend transversely between side walls 33 of the boxcar. The ends of the freight bracing bars 31 have end fittings 35 telescopically mounted thereon which are adapted to releasably engage suitable apertures in support rails 37 mounted on and extending longitudinally along the side walls 33 of the boxcar.

As illustrated in FIG. 4, any number of freight bracing bars 31 may be attached to the support members 37 so as to span the boxcar at any desired position so as to engage articles of freight to hold them in position during shipment. Reference is made to a copending application Serial No. 545,195, filed November 7, 1955, now Patent No. 2,879,721, and Patent Nos. 2,497,683 and 2,725,826, for a more detailed description of the freight bracing system as disclosed in FIG. 1. It is apparent that when employing freight bracing bars 31, inflatable tubes 39 may be affixed to the sides of the bars 31 in a manner similar to that previously described with relation to the vertical freight bracing bars 31 illustrated in FIGS. 1–3.

As most clearly illustrated in FIG. 5, when the freight bracing bars 31 are made of metal or the like with a box-like cross section the inflatable tubes 39 may be secured directly to opposite sides of the bar 31 by a suitable bonding material or the like, or by vulcanizing them thereto. With this construction, the freight bracing bar 31 may be positioned so as to span across a pair of selected supporting members 37 as closely to the articles of freight which are desired to be held in position as possible. The inflatable tube 39 adjacent the articles of freight may then be inflated so as to firmly engage the articles to take up any space between the articles and the freight bracing bar 31.

The remaining FIGURES 6–14 illustrate various modifications or types of freight bracing bars 31 and the manner in which the inflatable tubes are attached thereto. FIG. 6 illustrates a freight bracing bar comprised of a rectangular wooden member 41 partially enclosed by two channel-shaped members 43 which are affixed thereto by any suitable means such as by bolting. The inflatable tubes 39 are secured to the webs of the channel-shaped members 43.

As most clearly illustrated in FIG. 7, the freight bracing bar 31 may also be extruded with a dovetail slot 45 in one of the side walls thereof. An inflatable tube 47 may then be extruded from rubber or other similar material which lends itself to extrusion, with a longitudinally extending dovetail mounting flange 49 extruded on one side thereof. The inflatable tube 47 may then be quickly and firmly attached to the freight bracing bar 31 by simply sliding the dovetail mounting flange 49 within the dovetail slot or groove 45. With this construction, the inflatable tube 47 need not necessarily be bonded or otherwise adhesively secured to the freight bracing bar 31 and, therefore, is more readily replaceable if the need arises.

In the foregoing embodiments described, the inflatable tubes directly engage the articles of freight to be positioned. However, in the embodiment disclosed in FIG. 8, the inflatable tube is entirely disposed within the freight bracing bar in a more protected position. Such a freight bracing bar is comprised of two identical elongated wooden members 51 and 53 having a T-shaped cross section with two channel-shaped members 55 and 57 disposed over corresponding pairs of the outwardly extending flanges of the T-shaped cross section of the wooden members 51 and 53. The channel-shaped members 55 and 57 may be connected together in any suitable fashion such as by bolts 59 passing through the wooden members 51 and 53 and through suitable elongated slots 61 in the webs of the channel-shaped members to permit the wooden members to move laterally toward and away from each other so that the projection of the body portions 63 and 65 beyond the legs of the members 55 and 57, respectively, can be varied. An inflatable tube 67 is disposed between the wooden members 51 and 53 to force them apart when inflated so that the body portions 63 and 65 project between and beyond the legs of the channel-shaped members a maximum amount as illustrated in FIG. 8. Of course, when the tube is deflated the body portions 63 and 65 are free to be retracted by pushing the wooden members 51 and 53 together. With this construction, it is apparent that the freight bracing bar may be moved into position adjacent the article of freight to be held in position and the tube 67 inflated so that one or the other of the body portions 63 and 65 engage the article of freight rather than the inflated tube itself as in the previous embodiments, to greatly reduce the possibility of damage to the inflated tube.

FIGS. 9–13 illustrate several modifications or combinations of an inflatable tube with still another type of freight bracing bar commonly employed by the assignee of the present invention. Referring particularly to FIG. 9, a freight bracing bar 68 is comprised of two rectangular-shaped wooden members 69 and 71 interconnected by an elongated S-shaped member 73 having a web 75 and legs 77 with inwardly turned flanges 79 on the ends thereof. The wooden members 69 and 71 and the S-shaped member 75 may be interconnected by any suitable means such as by bolting or the like. It will also be observed that the inturned flanges 79 are disposed within notches 81 cut in the corners of the wooden members so that the flanges 79 do not project beyond the upper and lower surfaces of the wooden members. An inflatable tube 83 is then secured to the lower surface of the wooden member 71 for example, for engaging the articles of freight or the like. As illustrated in FIG. 9, the inflatable tube 83 is shown in its inflated position and engaging a surface 85 of an article of freight.

As most clearly illustrated in FIG. 10, an extruded channel-shaped member 87 having an outwardly presenting dovetail slot 89 extruded on the web thereof as previously described is affixed to the freight bracing bar 68 of FIG. 9 by any suitable means such as by bolting. An inflatable tube 91 having a longitudinally extending dovetailed mounting flange 93 extruded therewith may then be affixed to the channel-shaped member 87 by simply sliding the mounting flange 93 into the dovetail slot or groove 89 as previously described.

Referring to FIGS. 11–13, several constructions for mounting inflatable tubes on the freight bracing bar 68 of FIG. 9 so that the tubes do not have to contact the articles of freight directly are illustrated. Referring particularly to FIG. 11, the freight bracing bar 68 is illustrated with a channel-shaped member 95 having the legs thereof slidably connected to the wooden members 69 and 71 by bolts 97 passing through the wooden members and the web 75, and through elongated slots 99 in the legs of the channel-shaped member 95. Suitable enlarged washers 101 are also provided adjacent the head of the bolt and a nut 103 on the end thereof.

In this manner, the channel-shaped member 95 is free to move laterally toward and away from the bar 68 and an inflatable tube 105 may be positioned between the web of the channel-shaped member 95 and the side of the bar 68 to force the channel-shaped member away from the bar when the tube is inflated. A suitable wooden buffer strip 107 may also be secured to the outer surface of the web of the channel-shaped member 95 if desired to provide a more desirable surface for engaging surface 109 of an article of freight, or the like.

The inflatable tube 105 may be attached to either the side of the bar 68, or to the web of the channel-shaped member 95, but it is preferred that it be attached to the member 95 so as to be removable therewith. In this manner, the removable parts may be considered an accessory that can be mounted on the bar 68.

FIG. 12 illustrates a construction similar to that of FIG. 11 wherein the bar 68 is rotated 90 degrees and two channel-shaped members 111 and 112 are slidably connected on either side thereof by bolts 113, or the like. The legs of the channel-shaped members 111 and 112 have suitable slots 115 therein similar to the slots 99 of FIG. 11 to permit the lateral movement of the members relative to the bar 68. With this construction, inflatable tubes 117 and 118 may be inserted between the webs of each of the channel-shaped members 111 and the bar 68 to independently force the members 111 and 112 away from the sides of the bar. As illustrated in FIG. 12, the tube 117 is fully inflated and, therefore, the channel-shaped member 111 is at its outermost position whereas the tube 118 is substantially deflated, and, therefore, the member 112 is retracted. As in the embodiment illustrated in FIG. 11, it is preferred that the tubes be secured to the webs of the channel-shaped members 111 and 112.

Referring to FIG. 13, a modification of the structure of FIG. 11 is illustrated wherein a channel-shaped member 119 with relatively long legs 121 and 123 is positioned over the freight bracing bar 68 with the legs 121 and 123 projecting beyond the bar to enable a suitable pin 125 and snap ring 127 to interconnect the projecting portions of the legs to lock the channel-shaped member 119 on the bar 68. With this construction, the inflated tube 105 can be positioned between the web of the channel-shaped member 119 and the freight bracing bar 68 to urge the web of the channel-shaped member against a surface 129 of an article of freight, or the like, the buffer 107 being provided as previously described, if desired. FIG. 13 also illustrates the manner in which an air valve 131 is secured to the inflated tube 105 and projects through an elongated slot 133 in the leg of the channel-shaped member 119 to permit the tube to be inflated from a position outside the channel-shaped member. The slot 133 also permits the valve 131 to move vertically therein in response to the inflation and deflation of the tube 105. A similar slot would also be provided in the embodiment illustrated in FIG. 11 for permitting relative movement between the valve and the leg of the channel-shaped member 95 of FIG. 11.

FIG. 14 illustrates still another type of freight bracing bar 135 comprised of two channel-shaped members 137 and 139 with the webs thereof mounted back-to-back and having flanges 141 and 143 projecting in opposite directions from the ends of the legs of the members 137 and 139, respectively. Suitable rectangular wooden members 145 are secured between adjacent flanges 141 and 143 so as to project slightly therebeyond, and a wooden member 147 is affixed within the channel-shaped member 139 so as to project slightly beyond the surface defined by the flanges 143 thereof. An extruded channel-shaped member 149 is then positioned within the channel-shaped member 137 and has laterally extending flanges 151 thereon which lie against the flanges 141. It will be observed that the web of the extruded channel-shaped member 149 has a dovetail slot 153 extruded therein for receiving a dovetail mounting flange 157 of an inflatable tube 159 for contacting the articles of freight when inflated as previously described.

With this construction, the channel-shaped member 149 may be removed and replaced by a wooden member similar to the wooden member 147 to provide the freight bracing bar 135 with four wooden surfaces for contacting articles of freight. Wooden surfaces are preferred for contacting articles of freight for a number of reasons as explained in the previously-mentioned patents. Among other things, they provide nailing strips which permit shelving and other articles to be nailed to the freight bracing bar.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A freight bracing bar comprising two elongated wooden members each having a T-shaped cross section comprising a body portion having laterally outwardly extending flanges on one end thereof, the flanges of said wooden members being positioned in parallel back to back relationship with said body portions thereof projecting laterally outwardly, two parallel spaced-apart channel-shaped members each having the legs thereof hooked over a pair of corresponding flanges of each of said wooden members to limit movement of the wooden members in a direction away from one another, means for connecting said channel-shaped members together without interfering with the movement of said wooden members toward and away from one another, and an inflatable element disposed between said wooden members to move them away from one another so that said body portions of each of the wooden members can be projected outwardly between opposing legs of the channel-shaped members to engage freight.

2. A freight bracing bar comprising two elongated channel-shaped members mounted back to back with flanges extending in opposite directions from the free ends of the legs thereof, two elongated rectangular-shaped wooden members each disposed between and affixed to corresponding flanges and legs of the channel-shaped members, a third elongated rectangular-shaped wooden member disposed between and affixed to the legs and web of one of said channel-shaped members, an extruded channel-shaped member having flanges extending in opposite directions from the free ends of the legs thereof, said extruded channel-shaped member being affixed to the other of said channel-shaped members with the flanges, legs and web thereof engaging the flanges, legs and web of said other channel-shaped member, the web of said extruded channel-shaped member having a longitudinally extending outwardly presenting undercut groove formed therein, and an inflatable element having a longitudinally extending tongue, said tongue being disposed within said undercut groove for attaching the inflatable element to said extruded channel-shaped member.

(References on following page)

References Cited in the file of this patent

UNITED STATES PATENTS

| | | |
|---|---|---|
| 1,457,496 | Butler | June 5, 1923 |
| 1,790,688 | Willer | Feb. 3, 1931 |
| 1,819,254 | Mantle | Aug. 18, 1931 |
| 1,935,447 | Hoffman | Nov. 14, 1933 |
| 2,144,357 | Booharin | Jan. 12, 1937 |
| 2,144,410 | Luddington | Jan. 17, 1939 |
| 2,247,168 | Fontaine | June 24, 1941 |
| 2,449,591 | Couse | Sept. 21, 1948 |
| 2,589,101 | Leguillon et al. | Mar. 11, 1952 |
| 2,609,113 | Huffman | Sept. 2, 1952 |
| 2,656,943 | Nilsson | Oct. 27, 1953 |
| 2,674,206 | Scott | Apr. 6, 1954 |
| 2,725,826 | Toum et al. | Dec. 6, 1955 |
| 2,747,520 | Brown et al. | May 29, 1956 |
| 2,764,950 | Finnell | Oct. 2, 1956 |
| 2,769,404 | Dietrichson | Nov. 6, 1956 |
| 2,774,503 | Moore | Dec. 18, 1956 |
| 2,784,997 | Bauman | Mar. 12, 1957 |
| 2,834,304 | Chapman et al. | May 13, 1958 |
| 2,856,867 | Dasey | Oct. 21, 1958 |
| 2,907,580 | Tietig | Oct. 6, 1959 |

OTHER REFERENCES

"Extrusion of Metals," by Claude B. Pearson, pub. by John Wiley & Son Inc., 1944, Figures 116 and 118.

"Extrusion of Plastics, Rubber, Metals," by Simonds, Weith, and Schack, 1952, Figures 12-6, p. 249; 12-7, p. 254; 17-11, p. 342 relied on.